Sept. 5, 1933.     C. W. STEELE     1,925,884
APPARATUS FOR TRIMMING ARTICLES
Filed July 31, 1931     3 Sheets-Sheet 1
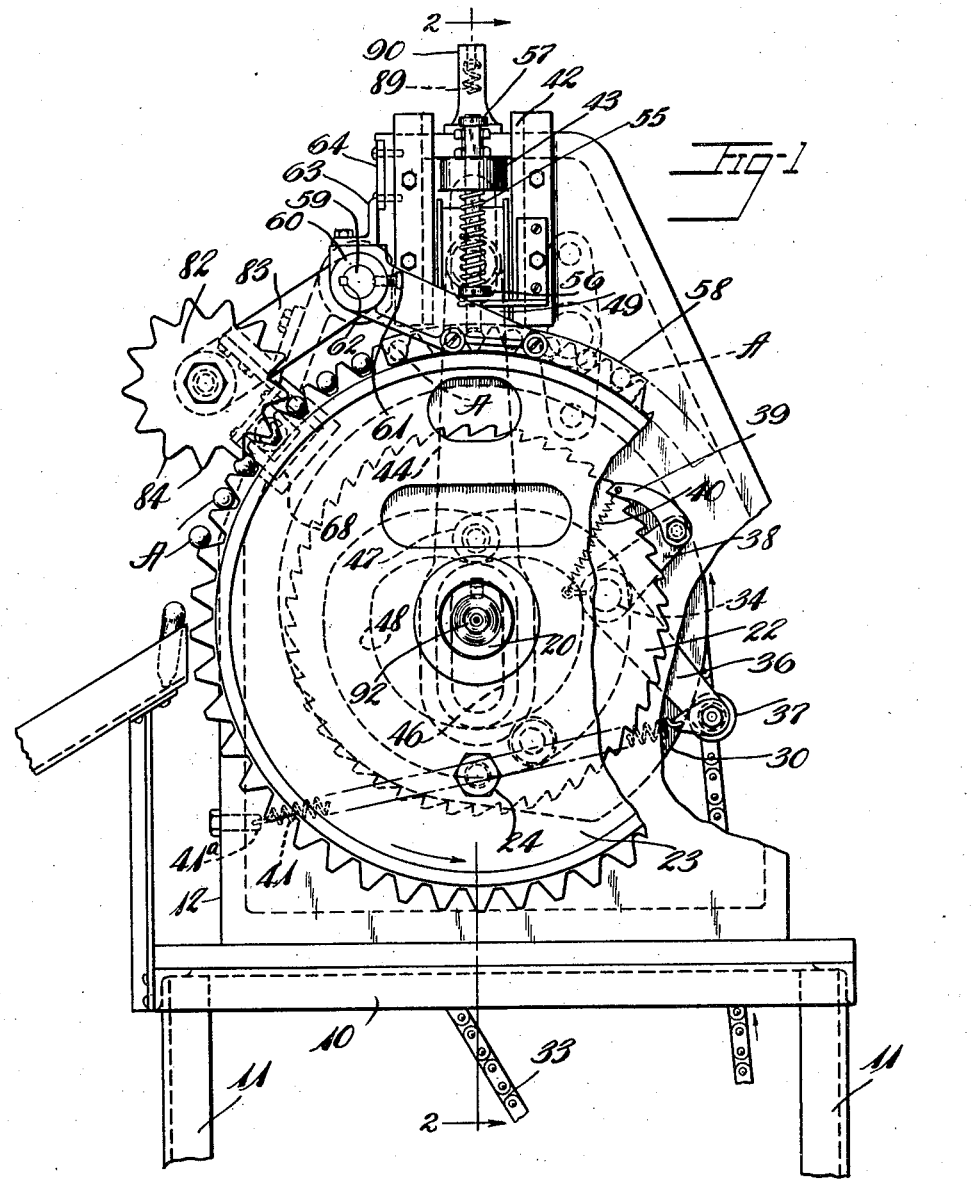
Inventor
Charles. W. Steele, Deceased.
by Lillian. K. Steele. Administratrix.
By Eakin & Avery
Attys.

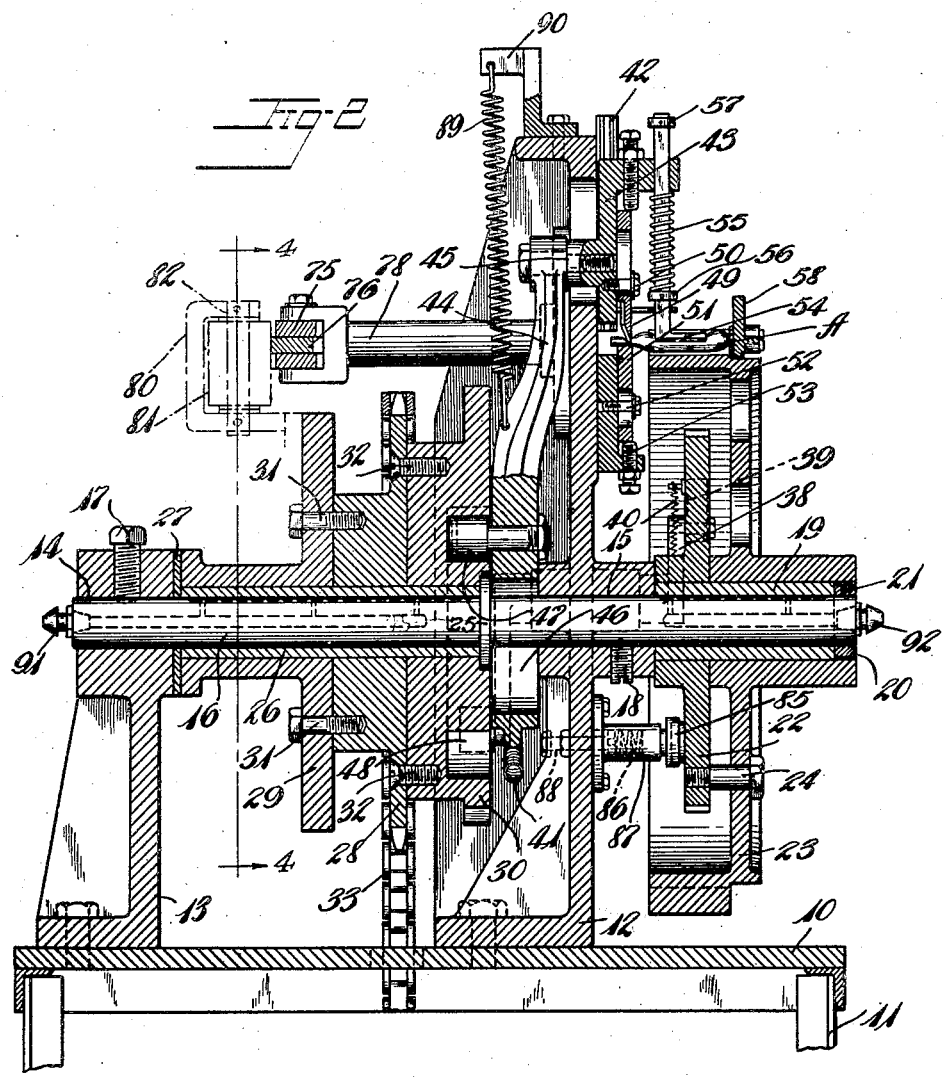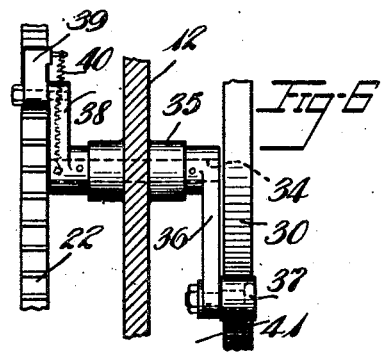

Sept. 5, 1933.  C. W. STEELE  1,925,884
APPARATUS FOR TRIMMING ARTICLES
Filed July 31, 1931   3 Sheets-Sheet 3
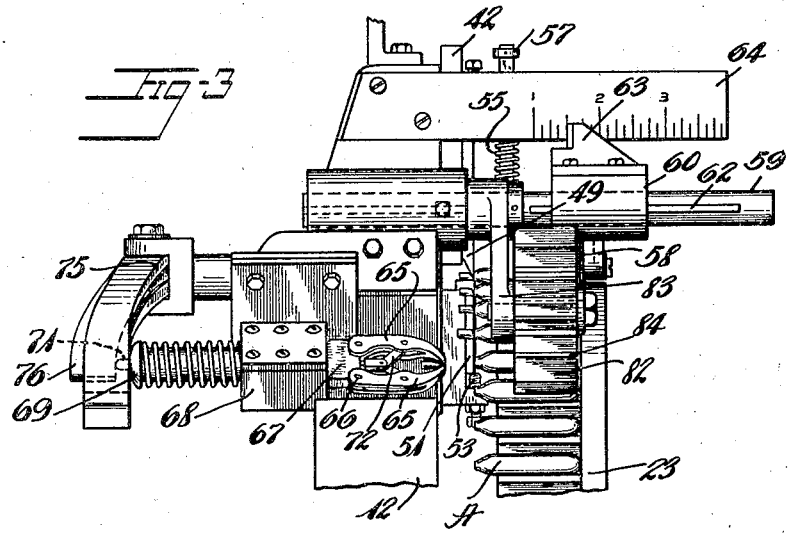
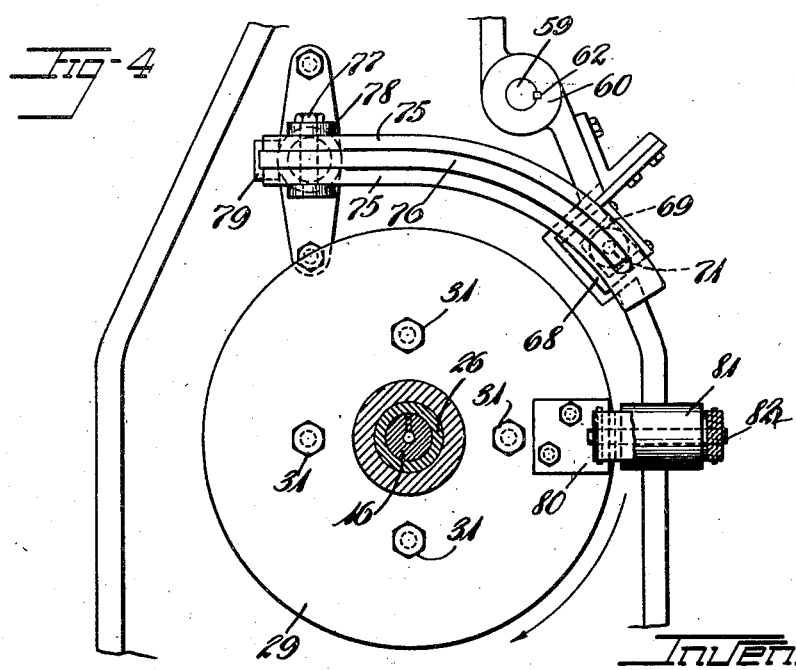

Patented Sept. 5, 1933

1,925,884

UNITED STATES PATENT OFFICE 1,925,884

APPARATUS FOR TRIMMING ARTICLES

Charles W. Steele, deceased, late of Akron, Ohio, by Lillian K. Steele, administratrix, Akron, Ohio, assignor to The B. F. Goodrich Company, New York, N. Y., a corporation of New York Application July 31, 1931. Serial No. 554,252

10 Claims. (Cl. 164—48)

The invention relates to apparatus for trimming articles and more especially to apparatus for trimming articles to length.

The invention is particularly useful in trimming light, flexible rubber articles such as "pen sacs" or ink reservoirs for self-filling fountain pens. These pen sacs are made from thin rubber tubing or are produced by dipping forms of the required dimensions in a rubber solution or dispersion. In the manufacture of such articles it is commercially impossible to produce the articles of the exact required length and having squared ends without trimming them after being formed and vulcanized.

The objects of the present invention are to trim the articles to length and perpendicular to their axis with accuracy and a minimum amount of labor.

In the drawings:

Fig. 1 is a front elevation of the apparatus, parts of the mechanism being broken away to more clearly show the relation of the parts thereof, the supporting legs being broken away.

Fig. 2 is a cross-sectional elevation on line 2—2 of Fig. 1 with the pincer-operating roller which is to the left of the line of section in Fig. 1, rotated to the plane of the section, and shown in dot and dash lines to illustrate its relation to the pincer-operating cam fingers.

Fig. 3 is a side elevation of the upper part of the apparatus, the lower part being broken away.

Fig. 4 is a detail cross-sectional elevation on line 4—4 of Fig. 2, showing the pincer-operating mechanism, parts of the apparatus being broken away.

Fig. 5 is a detail of the pincer mechanism, partially in section.

Fig. 6 is a detail elevation from the right of Fig. 1 showing the ratchet lever, ratchet and cam, the frame being broken away and sectioned, and the carrier wheel being removed.

Referring to the drawings, the numeral 10 designates a base plate supported by legs 11 at a convenient height. Mounted on the plate is a vertical frame 12 and a pedestal bearing 13 in spaced relation. Frame 12 and pedestal bearing 13 are provided with aligned bores 14 and 15 in which a shaft 16 is non-rotatably fixed as by set-screws 17 and 18, so as to project beyond the bore 15 and there rotatably support a quill 19. A collar 20 fixed to the end of the shaft 16, as by a set-screw 21, confines the quill against endwise motion. A ratchet wheel 22 is keyed to the quill 19 and a work-carrying wheel 23 is loosely carried on the quill 19 and fixed to the ratchet wheel 22 by a stud 24 which may be removed in order to change work-carrying wheels.

Rotatably mounted on shaft 16 between bracket 13 and a fixed shoulder 25 is a quill 26, a thrust washer 27 being located between one end of the quill and the bracket 13. Keyed to the quill and mounted thereon are a sprocket 28 and cam-discs 29 and 30 which are fastened together by screws 31 and 32. A sprocket-chain 33 passing over sprocket 28 drives the quill 26 and the cam discs carried thereby in a counter-clockwise direction as viewed in Fig. 1. The chain 33 is driven from any convenient source of power such as an electric motor, not shown.

The work carrying wheel resembles a gear wheel, being provided with lateral grooves about its periphery in which the articles to be trimmed are located. The article-advancing mechanism includes a shaft 34, rotatably mounted in a bearing 35 formed through frame 12 and having fixed thereon, at one end a lever 36 carrying a roller 37 which engages the peripheral cam-surface of cam 30, and, at its other end a ratchet lever 38 carrying a ratchet pawl 39 which engages the ratchet 22. A tension spring 40 having its end fast to pawl 39 and lever 38 holds the pawl against the ratchet and a tension spring 41 having one end anchored on frame 12 as at 41a and the other attached to arm 36 holds roller 37 in contact with the cam. The roller 37 is shown in Fig. 1 as riding a dwell of about 150 degrees during which the work carrying wheel is stationary. This dwell is followed by a drop of about 60 degrees during which the pawl is retracted over the ratchet wheel, and during the remaining angle the pawl is advanced by an amount sufficient to turn the work-carrying wheel by the amount of one space.

The trimming mechanism operates during the dwell of cam 30. Frame 12 is provided with a vertical guideway 42 in which is slidably mounted a ram 43. A pitman 44 is pivoted at 45 to ram 43 and is provided with a slot 46 which straddles the shaft 16 and a roller 47 which engages a cam groove 48 in the face of cam 30. This cam groove is of heart shape to provide uniform reciprocal motion to the ram 43. A knife blade 49 is adjustably mounted on ram 43 by bolts 50 and an anvil block 51 is adjustably supported from the frame member 12 for cooperation therewith as by clamp screws 52 and adjusting screws 53.

A presser foot 54 is provided for holding the article being cut and is slidably mounted on ram 43 and provided with a compression spring 55 compressed between ram 43 and a collar 56 on the stem of said foot, a second collar 57 being mounted on the stem above the ram. The presser foot 54 normally projects in advance of the knife 49 and clamps the article to the carrier wheel on the down stroke of the ram before the knife engages the article.

An adjustable guide 58 is clamped to a rod 59, projecting horizontally from the frame member 12, by a collar 60 and set screws 61, the rod being provided with a feather key 62 to prevent rotation of the collar. An index 63 fast to collar 60 adjacent a graduated scale 64 fixed to the frame member 12 determines the setting of the guide with respect to the desired length of the articles.

In order to maintain the sharpness of knife 49 it has been found advisable to adjust it with relation to anvil 51 so that the two do not contact. The trimmed ends of the articles remain attached to the articles after passing the knife. To remove the trimmed ends automatically operated pincers are provided comprising pincer blades 65 hinged at 66 to a hollow plunger 67 slidably mounted in a bracket 68 on frame member 12. The plunger 67 is squared near the pincers to fit the bracket and prevent rotation. Its rear end is counterbored and plugged by a threaded plug 69 having a flange larger than the stem of the plunger. A compression coil spring surrounds the stem of the plunger between the flange on the plug 69 and the bracket 68 and normally holds the plunger in retracted position. A toggle rod 70 extends through the plunger and plug lengthwise thereof and normally projects beyond the plug as at 71 at the rear end, the front end being pivoted to a pair of toggle links 72. A compression coil spring 73 encircles the toggle rod in the counterbore of the plunger and is compressed between a collar 74 fixed to the rod and the bottom of the counterbore so as to normally hold the pincers 65 in closed position as shown in Figs. 3 and 5.

In order to operate the pincers a pair of cam fingers 75 and 76 are pivotally mounted near their posterior ends by a pin 77 passing therethrough and through a bifurcated post 78 fastened to frame member 12. Finger 75 is slotted to provide two cam surfaces between which finger 76 is located and both fingers 75 and 76 are curved near their anterior ends to a radius having the center line of the shaft 16 as a center. Finger 67 normally rests upon the projecting end 71 of toggle rod 70 and finger 75 normally rests upon the plug 69 when the pincers are retracted and in this position their posterior ends rest against a shoulder 79 on post 78 which limits their movement to the left of Fig. 5.

Mounted on cam plate 29 is a bracket 80 carrying a roller 81 freely rotatable about a pin 82. Bracket 80 is so formed as to leave the face of roller 81 toward fingers 75 and 76 unobstructed and the roller is of sufficient width to span the fingers. During rotation of the cam 29 roller 81 engages fingers 75 and 76 near their pivoted portions and first depresses finger 76 until its face contacts with finger 75, thereby opening the pincers. During further movement the fingers are equally depressed thereby advancing the pincers until roller 81 passes the end of finger 76, whereupon the pincers are closed by spring 73 before the roller leaves the finger 75. On additional rotation of cam 29 finger 75 is released and the pincers are retracted by spring 74.

In order to hold the articles on the carrier wheel during the operation of the pincers a pinion 82 having considerable weight is mounted on a freely swinging arm 83 pivoted on rod 59 so as to freely rotate by engagement of its teeth 84 with the grooves in the carrier wheel in which it clamps the trimmed articles.

A friction brake 85 is held by a spring 86 against ratchet wheel 22 to prevent overrunning of the wheel and retraction thereof during backward movement of the pawl. Spring 86 is mounted in a barrel 87 mounted on frame member 12 and its tension may be adjusted by a screw 88 passing through the frame member.

Ram 43 is balanced by a tension coil spring 89 having one end attached to a bracket 90 fixed to frame member 12 and the other end attached to the pitman 44.

Shaft 16 is provided with lubricant passages connected to pressure lubricating fittings 91 and 92 for supplying lubricant to the quill bearings.

In the operation of the device the operator places the articles indicated by the letter "A" in the carrier-wheel grooves with their finished ends abutting the guide 58. As the carrier wheel is rotated, step by step, the articles are advanced one at a time over the anvil 51. The knife 49 descends and cuts nearly through the article while the presser foot holds the article in place. The articles are then advanced to a position where the pinion 82 again clamps them to the wheel, the pincers advance toward the articles and close over the hanging partially severed ends, and are then retracted breaking the remaining wall at the cut. The articles are further advanced until they reach a position where they are automatically discharged from the carrier wheel by gravity.

Where articles of somewhat adhesive material, such as articles containing a high percentage of rubber are cut as herein described, the cut edges of the article sometimes adhere to each other so that cutting the end therefrom unites the edges. By locating the pincer jaws substantially at right angles to the line of cut, the pressure of the jaws breaks the adhesion of the edges and opens them.

By supporting the ends of the article over the anvil and cutting by a movement radial of the carrier wheel, deflection of the articles and consequent angular cutting are avoided.

What is claimed is:

1. Apparatus for trimming articles, said apparatus comprising a conveyor for advancing the articles in spaced relation, means for clamping an article to the conveyor, means for partially severing a portion from the articles and tearing means for completing the severing thereof.

2. Apparatus for trimming articles to length comprising a conveyor for advancing the articles in spaced relation, means for trimming the articles to length, means for clamping the articles against endwise motion, and means for gripping and removing the superfluous ends by an endwise movement.

3. Apparatus for trimming articles, said apparatus comprising a conveyor adapted to intermittently advance the articles in spaced relation, means for partially severing, between movements of the conveyor, a part from an article so advanced, means for clamping the articles to the conveyor, and automatically operated pincers for completing the severing of the part from the article.

4. Apparatus for trimming vulcanized rubber articles, said apparatus comprising means for intermittently advancing the articles in spaced relation, means for partially severing a part therefrom, means for advancing pincers over the partially severed article, means for closing said pincers in engagement with the partially severed part, and means for retracting said pincers to complete the severing operation.

5. Apparatus for trimming ends from articles, said apparatus comprising a rotary article-carrying wheel, means for intermittently rotating the wheel, a reciprocating cutting device for cutting projecting ends from the articles between advancing movements thereof, means for actuating the cutting device in timed relation to the movement of the article carrying wheel, and a stationary anvil for supporting the projecting ends during the cutting operation.

6. Apparatus for trimming ends from articles as defined by claim 5 including a reciprocating presser foot for clamping the articles to the wheel in advance of the operation of the cutting device.

7. Apparatus for trimming ends from articles, said apparatus comprising means for advancing the article step by step, cutting means acting perpendicular to the line of travel for partially severing the ends from the articles, means cooperating therewith for supporting the ends to be severed, and means for pressing the superfluous ends laterally of the direction of cutter travel to open the ends of the articles.

8. Apparatus for trimming ends from articles, said apparatus comprising rotary means for advancing articles step by step in spaced relation, cutting means acting across the line of travel to partially sever projecting ends from said articles, means for frictionally retaining the article on the conveyer, and means for completing the severing operation by pulling the end away from the path of travel.

9. Apparatus for conveying and manipulating articles, said apparatus comprising a conveyor for advancing articles in series, means for clamping the articles to the conveyor means, and automatically operated pincers for plucking parts of the articles while so advanced.

10. Apparatus for trimming ends from articles, said apparatus comprising means for advancing the articles step by step, cutting means acting perpendicular to the line of article travel for partially severing portions from the articles, means cooperating therewith for supporting the portions to be severed, and means for pulling the partially severed portions away from the articles and thereby effecting the opening of the ends of the articles sealed by the severing of said portions therefrom.

LILLIAN K. STEELE,
*Administratrix of the Estate of Charles W. Steele, Deceased.*